INVENTORS:
M. J. LAMB
H. W. DE YARMETT
C. L. BARR
BY: *Louis J. Bovasso*

THEIR ATTORNEY

INVENTORS:
M. J. LAMB
H. W. DE YARMETT
C. L. BARR
BY: Louis J. Bovasso
THEIR ATTORNEY

United States Patent Office 3,438,203
Patented Apr. 15, 1969

3,438,203
METHOD OF REMOVING HYDROCARBONS FROM SALT CAVERNS
Marcus J. Lamb, New Orleans, and Harry William De Yarmett, Metairie, La., and Clifford L. Barr, Newgulf, Tex., assignors to Shell Oil Company, New York, N.Y., a corporation of Delaware
Filed Aug. 8, 1967, Ser. No. 659,187
Int. Cl. E21f 17/16
U.S. Cl. 61—.5    7 Claims

ABSTRACT OF THE DISCLOSURE

A method for removing oil and gas hydrocarbons from underground salt caverns by flowing oil and gas into a first cavern containing brine and storing the fluids until the oil, gas and brine separate. The gas phase is then removed through a main gas stream to shore and the oil is flowed into a second cavern containing brine by utilizing the pressure from the accumulation within the first cavern. Gas is then diverted from the main gas stream into a third cavern containing brine until the brine is displaced by the gas pressure. The displaced brine is flowed into the second cavern, thereby displacing the oil within second cavern and the oil is then flowed to a loading zone.

Background of the invention

*Field of the invention.*—This invention relates to the method of removing gas and oil hydrocarbons from underground salt caverns at offshore locations, and, more particularly, to a method for storing hydrocarbons and continually delivering gas to shore without interruption.

*Description of the prior art.*—The use of underground salt caverns, referred to as "salt jugs," for the storage of liquid hydrocarbons is quite well established. All of these jugs presently in use are being used to store either liquefied petroleum gas or other manufactured volatile liquids, but there is no doubt that oil also could be stored in them. On shore there is very little, if any, economic advantage for storing oil in salt jugs rather than in tankage at atmospheric pressure. The advantage becomes apparent, however, when large pressure storage is needed. For example, large (½ million barrel) oil storage offshore might cost upwards of $10.00 per barrel; whereas an equivalent size salt storage jug could cost under $2.00 per barrel and even less for larger jugs.

Salt contamination of the crude oil in salt jugs would not be a problem since the salt content of the crude is primarily due to emulsified brine contained in the crude. The jug would then act as a treater and gravity separation of the emulsified brine and oil will occur.

Many schemes have been suggested for storing crude oil in underground salt jugs. Only a few, however, have been found to be even remotely practical from an engineering and cost standpoint. Of these few, no arrangement of salt jugs is known which will allow oil to be stored in one of the salt jugs and, at the same time, provide a continuous supply of gas to the shore without interruption.

Summary of the invention

It is an object of this invention to provide an underwater system of storing oil and gas hydrocarbons in underground salt caverns and continually supplying gas flow to shore during the period when liquid batches are being received.

It is a further object to produce oil, gas and water from an underwater well in an underground salt formation wherein at least a portion of the production fluid is in the form of emulsions which may be readily and easily separated.

It is another object of this invention to accumulate hydrocarbons at a central point with a minimum of pipeline transportation and a maximum of efficiency.

It is a further object to decrease the load from an offshore location on a line to shore and thereby increase the gas capacity.

It is still another object to provide a deep water location accessible to large tankers making it possible to ship to distant points on a very flexible and economical basis.

These objects are carried out by using a three cavity system in an underground salt formation incorporating a surge jug, a brine storage jug and a dead oil storage jug. Gas and liquid hydrocarbons from one or more producing oil and gas production wells are received and stored in the surge jug until there is substantial separation of the diverse fluids making up the production fluid. The separated gas phase is then piped ashore through a main gas stream from the surge jug. The separated oil is displaced by utilizing the pressure from the gas accumulation in the surge jug and is held in the dead oil storage jug prior to barge or tanker pickup. A brine storage jug is used to store the saturated salt water used to displace the oil from the dead oil storage jug when loading a barge or tanker. The drive mechanism for the brine in the brine storage jug is a compressed gas cap formed in the brine storage jug as a result of diverting some of the gas from the main gas stream into the brine storage jug.

These and other objects of this invention will be understood from the following description when taken with reference to the attached drawing.

Description of the preferred embodiment

Figure 1:
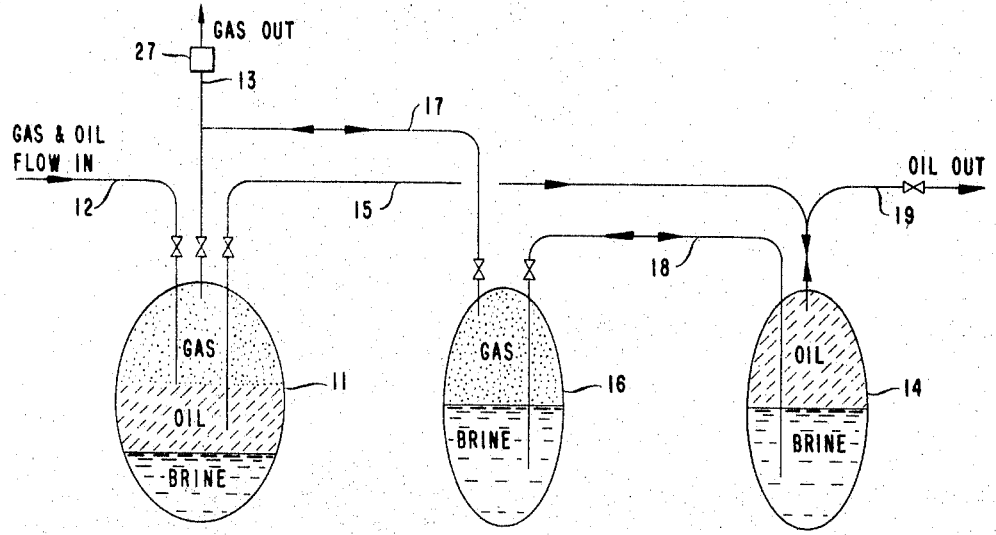
FIGURE 1 shows a basic flow scheme of a method for storing and removing hydrocarbons from underground salt caverns.

FIGURE 1 shows the basic flow scheme for use at an offshore tanker terminal for receiving at least oil and gas hydrocarbons from an onshore oil field or fields. The incoming liquid could either contain water or water is removed prior to being flowed through incoming pipeline 12 into the first salt cavern or "surge jug" 11 formed in an underground salt formation. The incoming gas and liquid can be decelerated through the use of multiple lines located on a platform placed over the jugs. Control valves with flow controllers could also be used to limit the flow rate during any abnormal conditions that might develop. Water may be present in surge jug 11 by either being pumped into the jug 11 or allowed to flow in with the oil and gas production fluid. The oil and gas production fluid and water or brine is then stored in the surge jug 11 in contact with the salt formation therein for a period of time and at a pressure and temperature sufficient to bring about substantial separation of the diverse fluids making up the production fluid. The separated gas phase is then flowed from the surge jug 11 to a shore terminal (not shown) through a single phase main gas pipeline 13. An adequate storage capacity of gas in the surge jug 11 will provide a continuous gas supply to shore during those periods when liquid batches are being received. The oil in surge jug 11 is then lifted out of the surge jug 11 by utilizing the pressure from the gas cap and flowed into a second salt cavern or "dead oil storage jug" 14 through oil pipeline 15. Brine is stored in a third salt cavern or "brine storage jug" 16 and then lifted to the surface of jug 16 by utilizing the pressure of gas diverted from the main gas stream pipeline 13 through gas pipeline 17 into brine storage jug 16. Since brine is heavier than oil, this lifted brine is used to displace the oil from the dead oil storage jug 14 by flowing the brine in jug 16 through brine pipeline 18 into jug 14. The oil displaced from dead oil storage jug 14 is then flowed to a tanker or barge loading (see FIGURES 3 and 4) through loading pipeline 19. In order to supply gas continuously from surge jug 11 to the main gas stream pipeline 13, the flow of oil from the dead oil storage jug 14 is discontinued and the oil volume in jug 14 is allowed to build up. Brine is then moved from the dead oil storage jug 14 back into the brine storage jug 16, thereby compressing the gas within the brine storage jug 16. This compressed gas then returns to the main gas stream pipeline 13 through gas pipeline 17 as can be seen in FIGURE 1. The water in jugs 11, 14 and 16 is preferably saturated brine formed from the surrounding body of water. Surge jug 11 could be a production well containing oil and gas hydrocarbons with any needed brine being pumped in to carry out the concepts of the invention. The use of saturated brine to displace the oil in the dead oil storage jug 14 limits subsequent enlargement of jug 14 which is undesirable. By releasing the compressed gas within the brine storage jug 16 into the main gas stream pipeline 13, gas is continually being sent to the receiving area without interruption and without the necessity of booster pumps.

Figure 2:
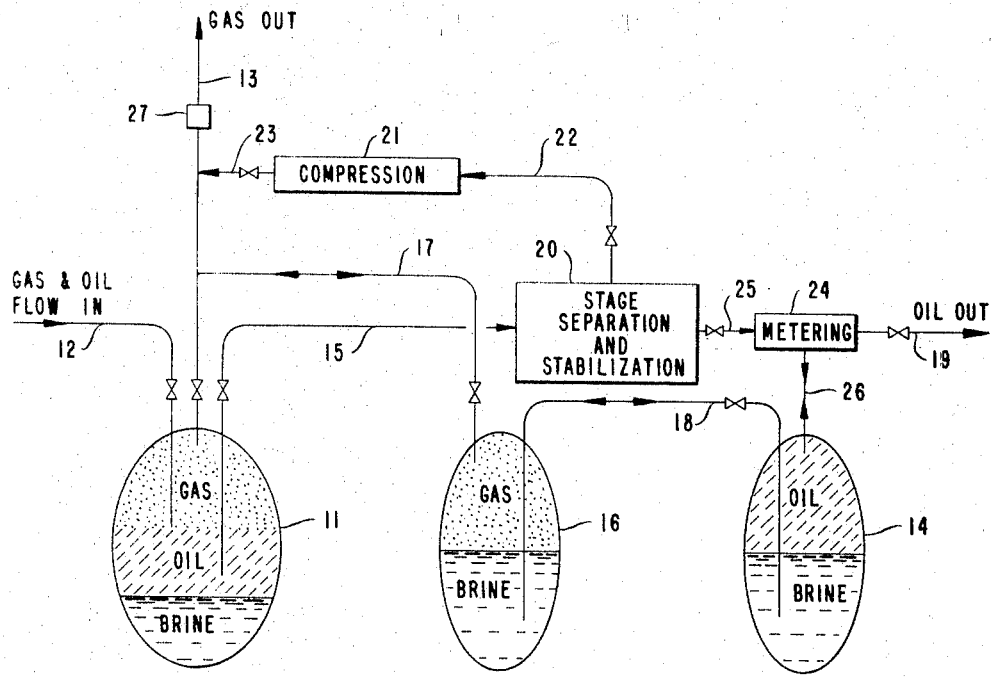
FIGURE 2 shows a flow scheme similar to FIGURE 1 incorporating certain desirable refinements.

FIGURE 2 shows the basic flow scheme of FIGURE 1 with certain added refinements. In FIGURE 2, like numerals refer to like parts of FIGURE 1. The operation of the system of FIGURE 2 is essentially the same as in the flow scheme of FIGURE 1. However, the crude oil received from surge jug 11 must be degassed to make it safe for loading into tankers without excessive venting of vapors. The stage separation and recompression facilities are shown as stage separation and stabilization apparatus 20 and compression apparatus 21. These facilities reduce the vapor pressure of the crude oil and thus eliminate loading losses attributable to vaporization and minimize tanker weathering losses. All vapors generated in the apparatuses 20 and 21, except those used for fuel during the separation process, are compressed and returned to the main gas stream pipeline 13.

In the systems of FIGURES 1 and 2, the crude oil in the surge jugs 11 is in equilibrium with the gas phase under some pressure. Gas pressure at the gas-oil interphase is then used to transfer the crude oil from the surge jug 11 of FIGURE 2 through oil pipeline 15 into the stage separation and stabilization apparatus 20. In order to keep the first stage recompressor horsepower requirements down, it is generally necessary to operate the first stage separator of the stage separation portion of apparatus 20 at the highest pressure possible. With the assistance of gas bubbles forming in the crude oil in the outlet line to lighten the column and by keeping the surge jug 11 as shallow as possible, the first stage separator can operate at a relatively low pressure. The vapors separated from the crude oil separation apparatus 20 by means well known in the art are then passed, through vapor separation pipeline 22, into compression apparatus 21 and from apparatus 21 through pipeline 23 into the main gas stream pipeline 13. The hydrocarbon condensate recovered from the stage separation portion of apparatus 20 is pumped into a stabilizer section in the same apparatus 20 so as to reduce the vapor pressure. This stabilized liquid is co-mingled with the degassed crude oil in the stage separation apparatus 20 and pumped into a metering device 24 through stabilization pipeline 25. The incoming liquid stream from pipeline 25 is metered by known means and any desired amount of the oil in metering station 24 can be passed into dead oil storage jug 14 through metering pipeline 26. Metered oil can also be passed through loading pipeline 19 directly to the tanker and barge loading area (see FIGURES 3 and 4).

It can be seen that a unique system of economically containing hydrocarbons offshore can be located at the junction of a main offshore header or fluid collection line and the line to shore. The main offshore header or fluid collection line preferably receives gas and oil in two-phase flow from a number of gathering laterals. The pressure at the tanker terminals varies, of course, depending upon conditions in the fluid collection line, but it can be expected to be sufficient to deliver the gas to shore several miles away without recompression. Means well known in the art, such as spheres and the like, can be introduced into the incoming pipeline to reduce the pressure drop of the incoming fluid. Thus, liquids would be received at the tanker terminal in batches which were picked up along the fluid collection line by, for example, spheres traveling at the velocity of the gas. The system of the instant invention therefore decelerates, receives and stores incoming hydrocarbons. Necessary platforms and processing equipment can be readily located over the salt jugs as is well known in the art.

Figure 3:
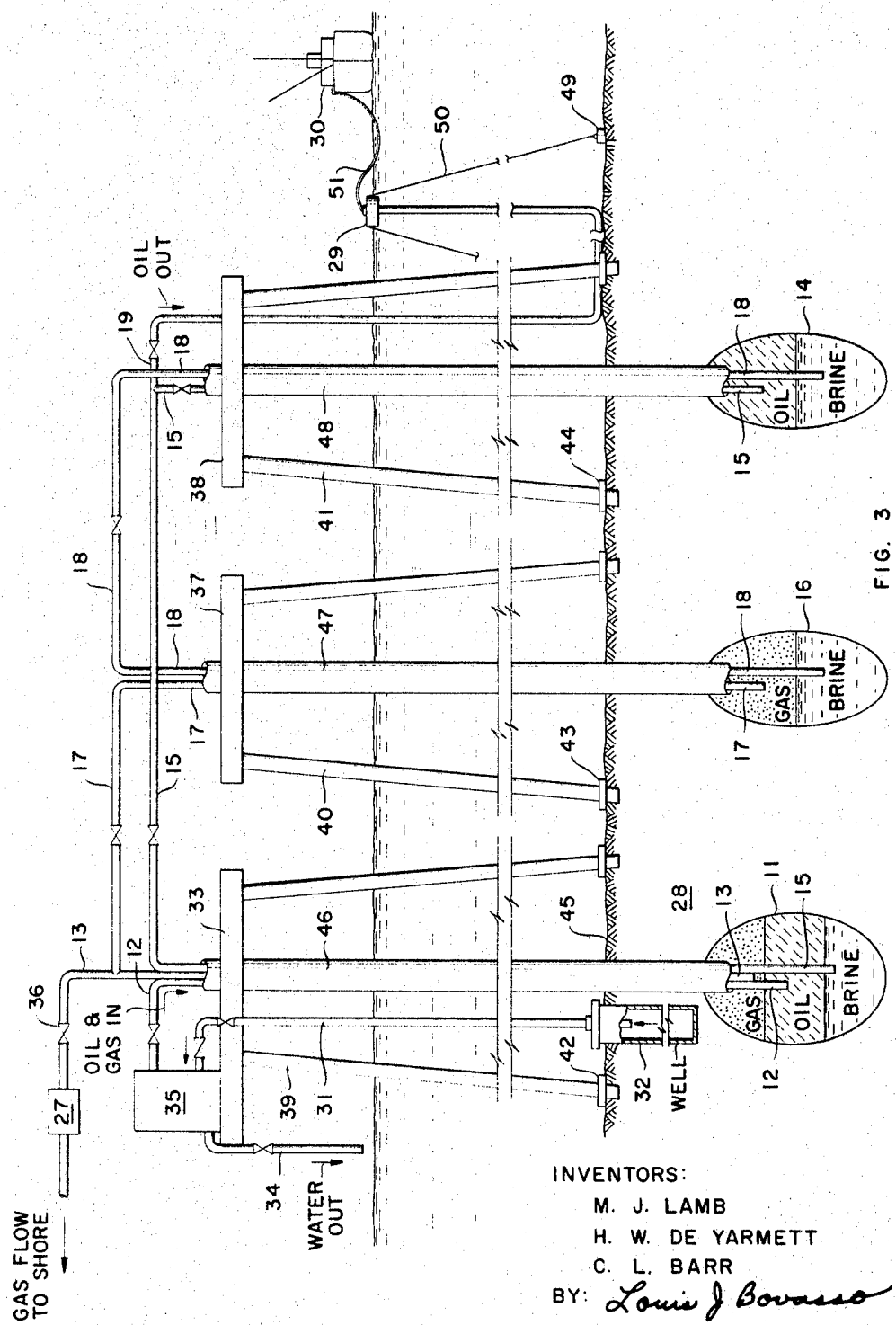
FIGURES 3 and 4 show vertical views of preferred tanker terminals to be used with the embodiments of FIGURES 1 and 2, respectively.
Figure 4:
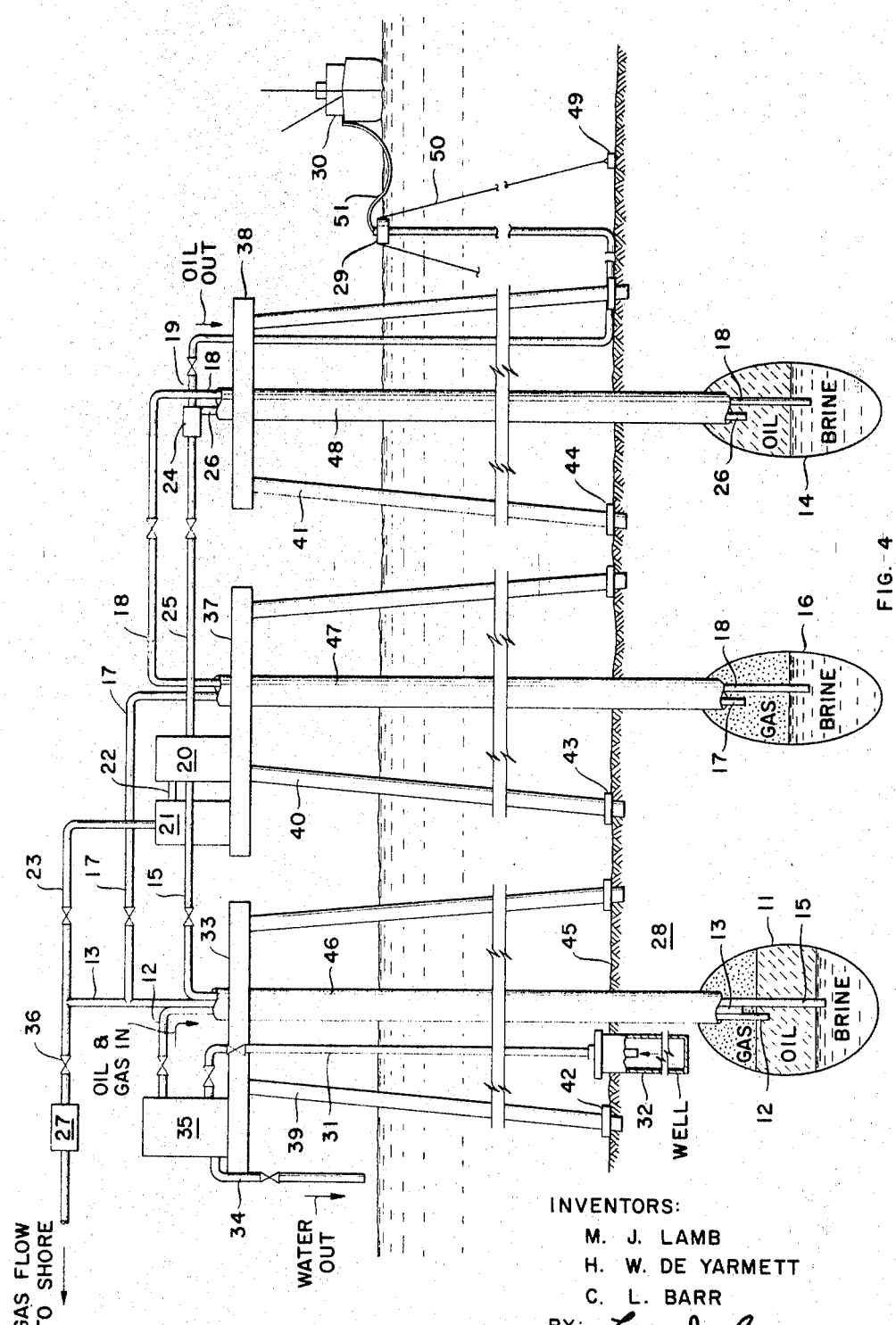

For example, FIGURES 3 and 4 show preferred production platforms and a tanker terminal located over the salt jugs 11, 14 and 16 formed in subterranean salt formations 28. The terminals of FIGURES 3 and 4 include platforms for providing space for the processing equipment and a single buoy mooring 29 for loading of tanker 30. It is to be understood that the installations include conventional offshore tanker terminal equipment, such as living quarters, landing platform, etc. The installation of FIGURE 3 is preferably to be used with the process of FIGURE 1; the apparatus of FIGURE 4 is preferably to be used with the process of FIGURE 2.

In FIGURE 3, like numerals refer to like elements of FIGURE 1. Oil and gas hydrocarbons are received in incoming line 31 from a producing well 32. As discussed previously, the oil and gas hydrocarbons may contain water. This mixture is flowed into an oil and gas separator 35 located on platform 33. Any water may be separated from the oil and gas hydrocarbons at separator 35 and flowed to water line 34 where the water is drained off, if desired, as is well known in the art. The remaining oil and gas hydrocarbons are flowed through pipeline 12 to surge jug 11 as discussed previously. After the gas separates in jug 11, it is permitted to flow out through the main gas pipeline 13 and is controlled by suitable means, such as valve 36 and flow controller 27, to deliver gas to a remote area, as, for example, to shore. Platforms 33, 37 and 38 are anchored through pile members 39, 40, 41 and suitable anchoring means 42, 43 and 44, respectively, to the ocean bottom 45. Incoming pipeline 12, gas pipeline 13 and oil pipeline 15 are disposed within a casing 46 which communicates with both surge jug 11 and the processing equipment on platform 33.

Gas pipeline 17 and brine pipeline 18 are disposed within a casing 47 communicating with both brine storage jug 16 and the processing equipment on platform 37. Gas pipeline 17 communicates with both the main gas pipeline 13 and brine storage jug 16. Brine pipeline 18 communicates with both brine storage jug 16 and dead oil storage jug 14. The oil pipeline 15 from surge jug 11 communicates with both the dead oil storage jug 15 and loading pipeline 19.

Oil pipeline 15 and brine pipeline 18 are disposed within casing 48 which communicates with both the processing equipment on platform 38 and the dead oil storage jug 14. All the pipelines of FIGURE 3 are controlled by suitable valves and flow control equipment so that the processes previously described above in the discussion of FIGURE 1 may be successfully carried out.

The oil exiting from loading pipeline 19 is flowed to single buoy mooring 29 suitably anchored at anchor 49 through one or more anchoring lines 50 to the ocean bottom 45. A freighter 30 is preferably anchored to mooring 29 for removing oil from loading pipeline 19 through tanker loading line 51 which is adapted to communicate with loading pipeline 19 as is well known in the art.

In FIGURE 4, like numerals refer to like elements of FIGURE 3. Here, the arrangement of the platforms 33, 37 and 38 and their accompanying flow control processing equipment is the same as discussed above concerning FIGURE 3 excepting provision is made for the compression, stage separation, stabilization and metering apparatus of the process of FIGURE 2. Thus, oil pipeline 15 extends from surge jug 11 through the stage separation and stabilization apparatus 20 and metering apparatus 24 prior to communicating with stabilization pipeline 25 and meter pipeline 26 which communicates with the dead oil storage jug 14. An additional pipeline 23, shown schematically in FIGURE 2, communicates with both main gas pipeline 13 and the compression apparatus 21. The compression apparatus 21 communicates through vapor separation pipeline 22 with the stage separation and stabilization apparatus 20. The stage separation and stabilization apparatus 20 communicates through stabilization pipeline 25 with metering apparatus 24. The flow scheme for the FIGURE 4 arrangement has been described in detail previously in the discussion of FIGURE 2; therefore, further comment is deemed unnecessary.

In order to minimize capital investment for compressors and plant equipment, the oil in the flow scheme of FIGURE 2 is stabilized on a continuous basis. In this type of system, there is practically no waste. When only gas is coming into the surge jug, the gas can be demisted and bypassed around the surge jug directly into the main gas stream pipeline 13 to shore.

As discussed previously, in order to support a steady gas flow in the main gas stream pipeline 13 to shore, a back pressure must be maintained on the surge jug 11 and the separation equipment in communication with surge jug 11. This back pressure in surge jug 11 is slightly above the pressure in the main gas stream pipeline 13 to shore. This pressure pack on the gas volume in the surge jug 11 is used to support the gas flow to shore when liquid slugs have blocked off the flow of gas and a reduced gas flow is being received at the platform (FIGURES 3 and 4) above surge jug 11. The instrument for controlling the back pressure in the surge jug 11 is preferably one equipped with fully adjustable zero to 100 percent proportional single mode control. This type of controller (not shown) will allow the gas in the surge jug to breathe, yet it will prevent the pressure from dropping below a predetermined setting at the surge jug head. This minimum back pressure on the surge jug is needed for lifting the oil and maintaining a minimum suction pressure on the compression apparatus 21 handling the flashed vapors. Within limits, the flow to shore can also be controlled through the flow rate controller 27. The main gas line to shore can be provided with facilities to launch conventional spheres to control liquid holdup and thereby reduce pressure drop. The surge jugs 11 can serve a secondary function as a separator and treater for liquids collected in a gathering system. These salt jugs have a lower capital investment and are safe from oceanic disturbances.

In order to insure an adequate factor of safety against burst, the relatively deep roof of the surge jug is preferably at a predetermined depth beneath the surface of the water. Since the dead oil storage jug 14 operates with brine displacement, the working pressure never needs to be higher than that produced by a column of saturated brine equal to the depth of the jug plus flow losses during tanker loading at high rates. Therefore, the roof of this jug 14 could be somewhat shallower than the surge jug. However, it is desirable that the roof of this jug 14 be relatively deep so that it can serve as a standby for the surge jug. The brine storage jug 16 is used solely as a brine reservoir and has a gas cap to provide the necessary lifting requirements for the brine. The working pressure in this jug 16 will be such that the roof of this jug should also be relatively deep. Its bottom depth may preferably be limited so that all the brine can be lifted with a lesser gas pressure without resorting to gas lift. However, should the gas cap pressure be too low, either a gas lift or deep well pump may be utilized to assist in the transfer of the liquids.

We claim as our invention:

1. A method of removing oil and gas hydrocarbons from salt caverns formed within impervious underground salt formations, said method comprising the steps of:
flowing a multiple-phase production fluid containing at least oil and gas hydrocarbons from a producing oil and gas production well;
flowing the production fluid into a first salt cavern containing water;
storing said production fluid in the first of said salt caverns in contact with the salt formation therein for a period of time and at a pressure and temperature sufficient to bring about substantial separation of the diverse fluids making up the production fluid;
removing the separated gas phase of the production fluid and injecting the gas phase into a main gas stream leading from the caverns to a remote point;
removing the separated oil phase of the production fluid by utilizing the pressure from the gas accumulation within the first cavern formed by the gas phase of the production fluid;
flowing the separated oil phase into a second salt cavern containing water;
injecting sufficient gas diverted from the main gas stream into a third salt cavern containing water formed within the impervious underground salt formation until the water in the third salt cavern is displaced by the gas pressure of the gas from the main gas stream;
displacing the oil out of the second salt cavern by flowing the displaced water from the third salt cavern into the second salt cavern; and
flowing the oil displaced from the second salt cavern to a remote area.

2. The method of claim 1 including the steps of:
stabilizing the separated oil phase prior to flowing it into the second salt cavern; and
metering both the stabilized oil received from the first salt cavern and the oil displaced from the second salt cavern prior to removing all of said oil to a remote location.

3. The method of claim 2 including the step of:
subsequently releasing the compressed gas within the third salt cavern into the main gas stream, thereby continually sending gas to the main gas stream without interruption.

4. The method of claim 3 including the step of:
maintaining a back pressure within the first salt cavern sufficient to support a steady flow of the gas in the main gas stream.

5. The method of claim 1 including the steps of:
separating any remaining solution gas contained in the removed oil phase prior to flowing the oil phase into the second salt cavern;
recompressing any separated solution gas; and
injecting any recompressed solution gas into the main gas stream remote of the caverns.

6. The method of claim 1 wherein the step of diverting gas into a third salt cavern containing water includes the step of filling the third salt cavern with brine prior to diverting the gas into the third salt cavern in order to limit subsequent enlargement of the second salt cavern.

7. The method of claim 1 comprising the steps of:
subsequently discontinuing the flow of oil from the second salt cavern to the remote area while allowing build up of oil volume in the second salt cavern; and
moving water from the second salt cavern to the third salt cavern, thereby compressing the gas within the third salt cavern.

References Cited

UNITED STATES PATENTS

| 2,922,281 | 1/1960 | Brooks | 61—.5 |
| 2,934,904 | 5/1960 | Hendrix | 61—.5 |
| 3,253,414 | 5/1966 | Molique | 61—.5 |
| 3,385,067 | 5/1968 | Van Eek | 61—.5 |

EARL J. WITMER, *Primary Examiner.*